US012168623B2

(12) United States Patent
Lin

(10) Patent No.: US 12,168,623 B2
(45) Date of Patent: Dec. 17, 2024

(54) FERRIC IRON-DOSED ANAEROBIC BIOLOGICAL WASTEWATER TREATMENT TECHNOLOGY

(71) Applicant: West Virginia University, Morgantown, WV (US)

(72) Inventor: Lian-Shin Lin, Morgantown, WV (US)

(73) Assignee: WEST VIRGINIA UNIVERSITY, Morgantown, WV (US)

( * ) Notice: Subject to any disclaimer, the term of this patent is extended or adjusted under 35 U.S.C. 154(b) by 461 days.

(21) Appl. No.: 17/753,625

(22) PCT Filed: Sep. 24, 2020

(86) PCT No.: PCT/US2020/052459
§ 371 (c)(1),
(2) Date: Mar. 9, 2022

(87) PCT Pub. No.: WO2021/061958
PCT Pub. Date: Apr. 1, 2021

(65) Prior Publication Data
US 2022/0332615 A1    Oct. 20, 2022

Related U.S. Application Data

(60) Provisional application No. 62/905,846, filed on Sep. 25, 2019.

(51) Int. Cl.
*C02F 3/34* (2023.01)
*C02F 3/28* (2023.01)
(Continued)

(52) U.S. Cl.
CPC ............ *C02F 3/341* (2013.01); *C02F 3/2866* (2013.01); *C02F 3/345* (2013.01); *C02F 3/346* (2013.01);
(Continued)

(58) Field of Classification Search
CPC ........ C02F 3/341; C02F 3/2866; C02F 3/345; C02F 3/346; C02F 2101/20;
(Continued)

(56) References Cited

U.S. PATENT DOCUMENTS

| 5,342,769 A | 8/1994 | Hunter et al. |
| 7,393,452 B2 | 7/2008 | Tay et al. |
| 2005/0115880 A1 | 6/2005 | Pollock |

FOREIGN PATENT DOCUMENTS

| CN | 107399829 A | * 11/2017 |
| WO | 2016033637 A1 | 3/2016 |

OTHER PUBLICATIONS

English translation of CN107399829 (Year: 2017).*
(Continued)

*Primary Examiner* — Terry K Cecil
(74) *Attorney, Agent, or Firm* — Buchanan Ingersoll & Rooney PC

(57) ABSTRACT

A method for treating wastewater comprising subjecting a sulfate containing wastewater to Fe(III) iron dosing in an anaerobic bioreactor containing one or more of an iron reducing bacteria and one or more of a sulfate reducing bacteria, and one or more of a fermentative bacteria, and adjusting a dosage of the Fe(III) iron in the anaerobic bioreactor to achieve a Fe/Sulfate molar ratio that is equal to or greater than 0.50, and removing an effluent from the anaerobic bioreactor that is a treated wastewater. A wastewater treatment system is provided having a wastewater reservoir, a ferric iron solution reservoir, an anaerobic bioreactor, and an effluent reservoir.

13 Claims, 8 Drawing Sheets

(51) Int. Cl.
    *C02F 101/20* (2006.01)
    *C02F 101/30* (2006.01)
    *C02F 103/10* (2006.01)

(52) U.S. Cl.
    CPC ...... *C02F 2101/20* (2013.01); *C02F 2101/30* (2013.01); *C02F 2103/10* (2013.01)

(58) Field of Classification Search
    CPC  C02F 2101/30; C02F 2103/10; C02F 1/5245; C02F 2001/5218; C02F 3/28; C02F 2209/40; C02F 2101/101; C02F 2101/105; C02F 2209/08; C02F 2301/046
    See application file for complete search history.

(56) References Cited

OTHER PUBLICATIONS

Ivanov, V., et. al., Phosphate removal from the returned liquor of municipal wastewater treatment plant using iron-reducing bacteria. ,2005, Journal of Applied Microbiology, vol. 98, pp. 1152-1161.
Ahmed, M., et. al., Functional interrelationships of Microorganisms in Iron-Based Anaerobic Wastewater Treatment, 2021, Microorganisms, 9,1039, pp. 2-17.
Anwar, R., et al., Prospect of utilizing coal mine drainage sludge as an iron source for value-creating applications, 2021, Rev Environ Sci Biotechnol, 20:679-695.

* cited by examiner

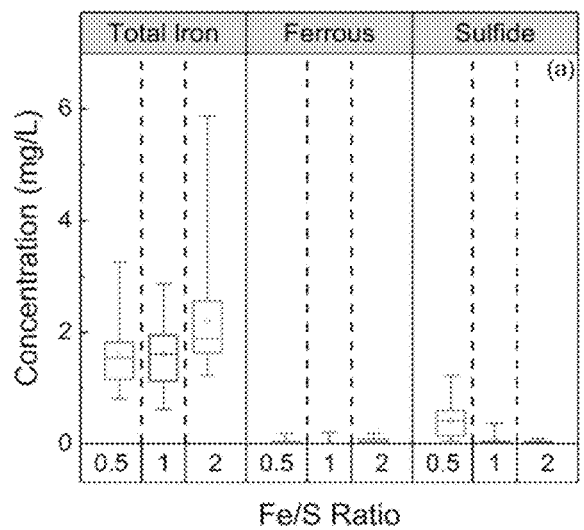
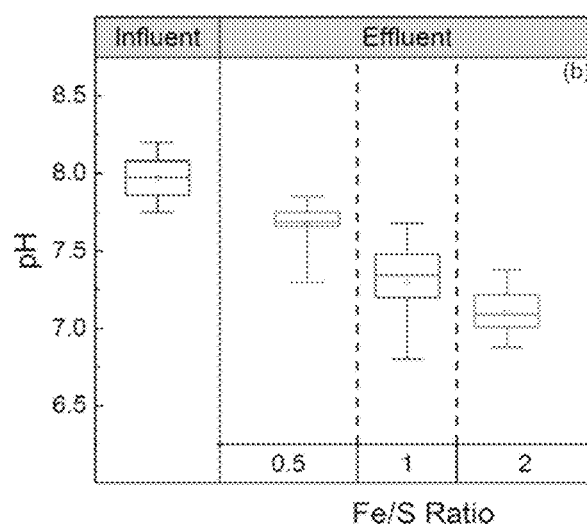
Fig. 2 (a)  Fig. 2(b)
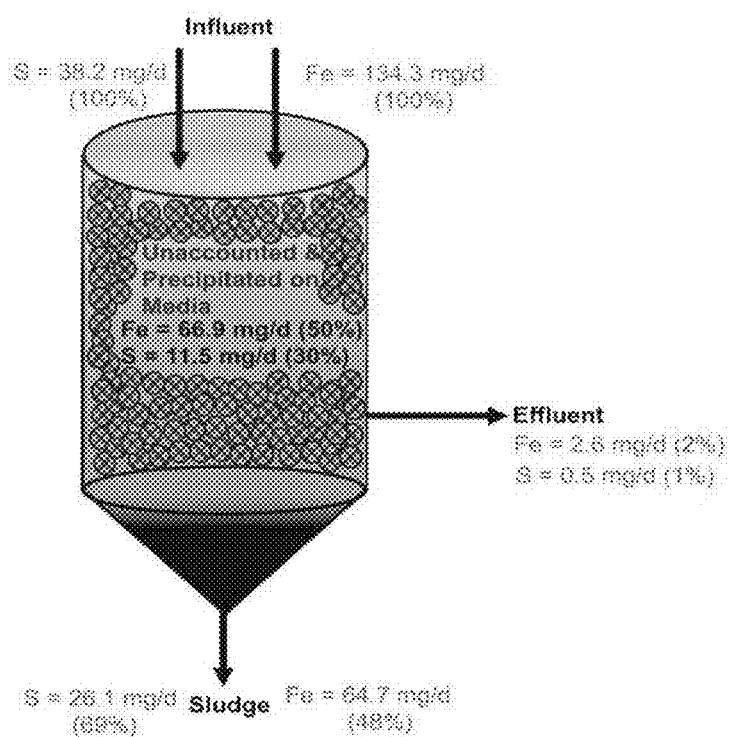
Fig. 3

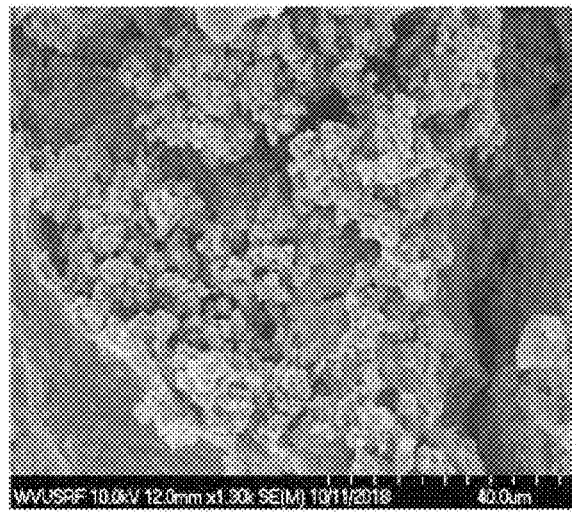
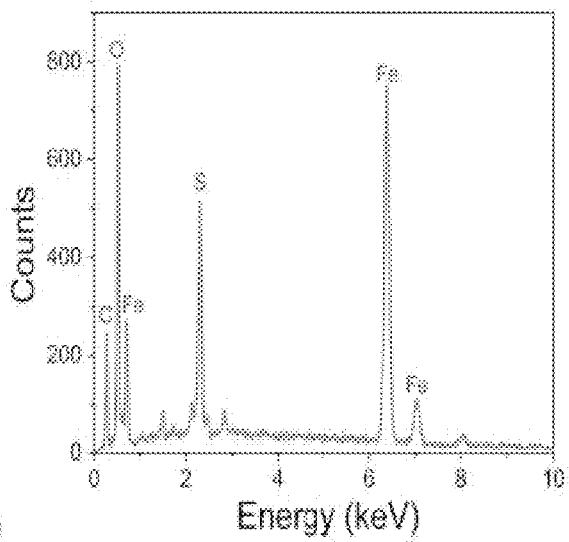
Fig. 10 (a)
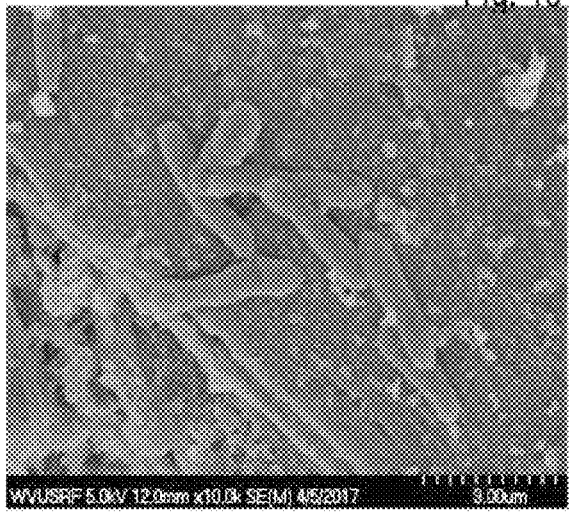
Fig. 10 (b)
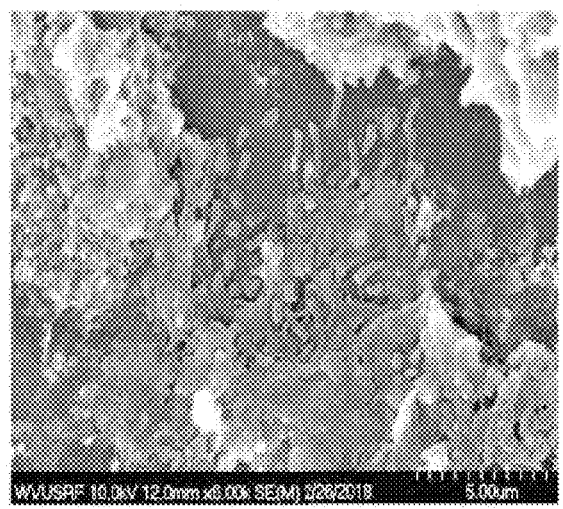
Fig. 10 (c)

FERRIC IRON-DOSED ANAEROBIC BIOLOGICAL WASTEWATER TREATMENT TECHNOLOGY

CROSS-REFERENCE TO RELATED APPLICATION

This utility non-provisional patent application claims the benefit of priority to U.S. Provisional Patent Application Ser. No. 62/905,846, filed Sep. 25, 2019. The entire contents of U.S. Provisional Patent Application Ser. No. 62/905,846 is incorporated by reference into this utility non-provisional patent application as if fully rewritten herein.

STATEMENT REGARDING FEDERALLY SPONSORED RESEARCH OR DEVELOPMENT

This invention was made with government support under Grant No. OIA-1458952 awarded by the National Science Foundation. The government has certain rights in the invention.

BACKGROUND OF THE INVENTION

1. Field of the Invention

This invention provides a wastewater treatment method using an innovative Fe(III)-dosed anaerobic bioreactor treating synthetic wastewater under varied Fe(III)/sulfate (Fe/S) ratios. The treatment system was operated continuously for 500 days with a constant hydraulic retention time. COD (Chemical Oxygen Demand) removal efficiency was attributed to organics oxidation coupled to both iron and sulfate reduction, and observed as 84±4%, 86±4% and 89±2% under Fe/S molar ratios of 0.5, 1 and 2 respectively. The increasing COD removal efficiency was corroborated by a similar increasing trend of COD removal rate that ranged from 468±25 mg/L/d to 497±12 mg/L/d. Effluent quality was also regulated by the Fe/S ratio with sulfide levels decreasing from 0.42±0.3 mg/L under Fe/S ratio 0.5 to 0.03±0.02 mg/L under ratio 2 due to increasing quantity of ferrous iron for forming ferrous sulfide precipitates. The sludge samples contained organics (biomass) and inorganic precipitates (FeS and FeS2) with the inorganic fraction increasing from 60% to 80% as the Fe/S ratio increased from 0.5 to 2. Microbiological analyses of the sludge samples showed *Geobacter* sp., *Geothrix* sp. and *Ignavibacteria* sp. as putative iron reducers, and *Desulfovibrio* sp., *Desulfobulbus* sp., *Desulfatirhabdium* sp., *Desulforhabdus* sp. and *Desulfomonile* sp. as putative sulfate reducers. Relative abundances of the iron reducers to the sulfate reducers increased with Fe/S ratio. This suggests faster carbon oxidation kinetics by the iron reducers than the sulfate reducers given the overall higher organics oxidation kinetics under the higher Fe/S ratios.

2. Description of the Background Art

In the efforts of moving towards more sustainable wastewater management, anaerobic treatment is increasing in popularity due to its energy efficiency, cost effectiveness, low sludge production and greenhouse emission, as well as the potential for resource recovery [1,2]. Nitrate, sulfate and carbon dioxide are electron acceptors commonly used in anaerobic biological processes to treat wastewater [3,4]. Due to its highly redox-active nature, the prospect of using ferric iron as an electron acceptor in wastewater treatment was recently reviewed and demonstrated in a batch study [5,6]. Iron, the second most abundant mineral on earth, is often found in wastes (e.g., acid mine drainage and coal ash) and these wastes can be readily used as a cheap source of iron for wastewater treatment. Iron has been commonly used for coagulation, Fenton's reagent, and sulfide toxicity and odor control in wastewater treatment [7-9]. A recent study found that Fe(III) dosing in wastewater treatment can also promote removal of organic micropollutants via adsorption of the compounds on iron sulfide (FeS) surface and subsequent biodegradation [10]. In addition, biogenic iron sulfide sludge produced as a byproduct of iron-dosed wastewater treatment has great applications in remediation of soil and groundwater contamination as well as in wastewater treatment. Iron sulfides and nanoparticles synthesized from iron sulfides were found effective in removal of organic contaminants (benzene, chlorinated organic pollutants, aromatic hydrocarbons), toxic metals (As, Pb, Hg, Cd, Cr), nutrients (N and P), and radionuclides (U and Se) [11,12]. Moreover, this iron sulfide sludge can potentially be converted into useful products with magnetic properties (e.g., magnetite) for phosphorus recovery from wastewater [13-16]. This iron-based wastewater treatment does not produce biogas as in methanogenic process. However, its multiple potential benefits (use of iron-containing wastes, no aeration, unique reaction mechanisms for coagulation, sulfide control, organic micropollutant removal, and useful sludge byproduct) render this treatment method versatile. It can be tailored to meet treatment needs such as decentralized treatment with low operation and maintenance requirements.

In Fe(III)-dosed anaerobic wastewater treatment, both Iron reducing bacteria (IRB) and sulfate reducing bacteria (SRB) can contribute to microbial oxidation of organics given the prevalent presence of sulfate in wastewater. Under substrate limiting conditions, IRB can outcompete SRB by diverting the electron flow away from SRB [17]. However, for treatment applications of wastewaters, in which substrate limiting is unlikely (Chemical Oxygen Demand, COD, 339-1,016 mg/L, [18]), the symbiotic relationship between IRB and SRB is currently unknown. In such a treatment system, availability of ferric iron and sulfate is expected to regulate the microbial activities of IRB and SRB, and the overall treatment performance. In addition, the treatment effectiveness also depends on the types of ferric compound, pH, organic compounds and their concentrations as well as reactor configuration [19,20].

*Geobacter* sp. and *Shewanella* sp. are two of the most well-studied iron-reducing taxa in the natural environment [21]. The interactions of these iron reducers with insoluble ferric surface are quite dissimilar from each other. *Shewanella* sp. was observed to have direct and indirect (ligand, electron shuttle) electron transfer to insoluble ferric surface, whereas *Geobacter* sp. was often found to rely on pilin filaments for electron transfer [21,22]. Some of the IRB were observed to be closely linked with SRB belonging to the same taxa and utilizing same electron acceptor for growth. For example, *Desulfovibrio* sp., a common SRB, was observed to perform ferric reduction and organic compound oxidation in an iron reducing environment [23]. In an engineering treatment system, the abundances of these reducers and other microorganisms are dependent on the concentrations and bioavailability of the electron acceptors (i.e., ferric iron vs. sulfate) and organic compounds. The respective populations of IRB and SRB in turn affect the treatment performance of organics oxidation kinetics [5].

SUMMARY OF THE INVENTION

This invention provides a wastewater treatment system (1), see FIG. 7, comprising a wastewater reservoir (2), a ferric iron solution reservoir (3), an anaerobic bioreactor (4), and an effluent reservoir (5), wherein the wastewater reservoir (2) is connected to the anaerobic bioreactor (4) via a first port (6), wherein the ferric iron solution reservoir (3) is connected to the anaerobic bioreactor (4) via a second port (7), and wherein the effluent reservoir (5) is connected to the anaerobic bioreactor (4) via a third port (8), and wherein the anaerobic bioreactor (4) contains one or more of an iron reducing bacteria and one or more of a sulfate reducing bacteria, and a fourth port (9) for providing internal recirculation within said anaerobic bioreactor, a first pump (10) in communication with the first port (6) for feeding a wastewater from the wastewater reservoir (2) to the anaerobic bioreactor (4), a second pump (11) in communication with the second port (7) for feeding a ferric iron solution from the ferric iron solution reservoir (3) to the anaerobic bioreactor (4), a third pump (12) in communication with the fourth port (9) for providing internal recirculation of the wastewater within the anaerobic bioreactor (4). In another embodiment of the wastewater treatment system of this invention includes wherein the bioreactor contains one or more of an iron reducing bacteria, one or more of a sulfate reducing bacteria, and one or more of a fermentive bacteria.

In another embodiment of this invention, a wastewater treatment system is provided, as described herein, wherein the iron containing solution is selected from the group consisting of ferric chloride, acid mine drainage, and an electron acceptor for organic oxidation that is not oxygen.

Another embodiment of this invention provides a method for treating wastewater comprising adding a sulfate containing wastewater and an effective amount of a ferric iron containing solution to an anaerobic bioreactor wherein the anaerobic bioreactor is a vessel that has a top, a bottom, and one or more side walls, and one or more ports for entry of one or more influents and exit of one or more effluents, and providing the anaerobic bioreactor with one or more of an iron reducing bacteria and one or more of a sulfate reducing bacteria, and one or more of a fermentative bacteria, to form a mixture in the anaerobic bioreactor of the sulfate containing wastewater, the ferric iron containing solution, the iron reducing bacteria, the sulfate reducing bacteria, and the fermentative bacteria; maintaining an anaerobic condition in the anaerobic bioreactor; adjusting a dosage of the ferric iron containing solution to the mixture in the anaerobic bioreactor to achieve a Fe/Sulfate molar ratio that is equal to or greater than 0.50; providing an internal recirculation of the mixture in the anaerobic bioreactor; maintaining a neutral pH of the mixture in the anaerobic bioreactor; producing a sludge at the bottom of the anaerobic bioreactor; and removing an effluent from the anaerobic bioreactor that is a treated wastewater. Optionally the method of this invention includes removing the sludge from the bottom of the anaerobic bioreactor.

In the methods of treating a sulfate wastewater of this invention, the sulfate containing wastewater is derived from domestic, municipal, and industrial sources. This sulfate containing wastewater includes suspended solids, biodegradable organics, pathogens, nutrients, heavy metals, and pollutants.

In another embodiment of the method of this invention, as described herein, includes increasing the ferric iron dosing of the mixture in the anaerobic bioreactor to affect an enhanced organic component removal and oxidation kinetics.

In another embodiment of this method as described herein, includes increasing the ferric iron dosing to affect a lowering of a sulfide level in said effluent through forming iron sulfide precipitates.

In another embodiment of the method of this invention, as described herein, includes increasing a chemical oxygen demand removal.

In a preferred embodiment of the method of treating a sulfate wastewater, as described herein, includes wherein the iron reducing bacteria is selected from the group consisting of *Geobacter* sp., *Ignavibacteria* sp., and *Geothrix* sp.

In a preferred embodiment of the method of treating a sulfate wastewater, as described herein, includes wherein the sulfate reducing bacteria is selected from the group of *Desulfovibrio* sp., *Desulfobulbus* sp., *Desulfatirhabdium* sp, *Desulforhabdus* sp., and *Desulfomonile* sp.

In another embodiment of the method of treating a sulfate wastewater of this invention, as described herein, includes wherein the ferric iron containing solution is selected from the group consisting of ferric chloride, acid mine drainage, and an electron acceptor for organic oxidation that is not oxygen.

BRIEF DESCRIPTION OF THE DRAWINGS

FIG. 1(*b*) shows COD oxidation rates under different Fe/S molar ratios.

FIG. 2(*a*) shows effluent total iron, ferrous and sulfide concentrations at different Fe/S molar ratios.

FIG. 2(*b*) shows influent and effluent pHs at different Fe/S molar ratios.

FIG. 3 shows mass flow rates of Fe and S throughout the biological treatment under Fe/S molar ratio 2 of this invention.

FIG. 5(*b*) shows XPS spectrum of S2p region of a sludge sample.

FIG. 6(*a*) shows the microbial distribution of putative IRB and SRB.

FIG. 6(*b*) shows relative abundances or IRB and SRB at different Fe/S molar ratios.

FIG. 10(*a*) (left side) shows a SEM micrograph of a sludge material under Fe/S molar ratio.

FIG. 10(*a*) (right side) shows an EDS spectrum of a sludge material under Fe/S molar ratio.

FIG. 10(*b*) shows a SEM photograph of cells present in anaerobic sludge.

FIG. 10(*c*) shows a SEM photograph of cells present in anaerobic sludge.

DETAILED DESCRIPTION OF THE INVENTION

Figure 1A:
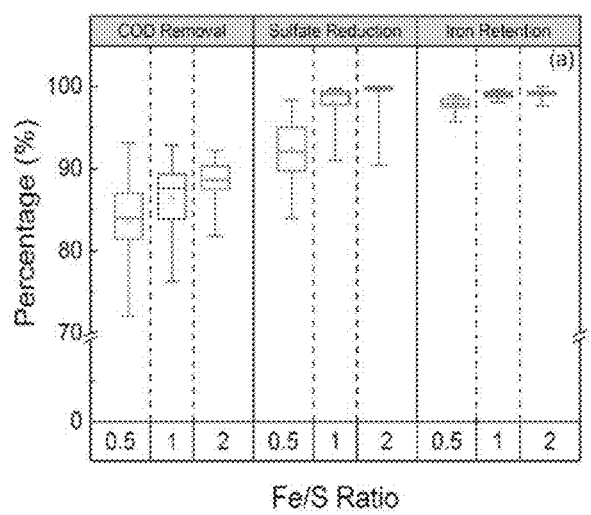
FIG. 1(*a*) shows COD removal, sulfate reduction and iron retention under different Fe/S molar ratios.

Building upon a previous fed-batch study of reaction kinetics [5], the present invention investigates the long-term performance of continuous Fe(III)-dosed anaerobic biological treatment of sulfate-containing wastewater under varied ferric and sulfate concentrations (expressed as Fe/S ratios). Specifically, this invention focuses on how Fe/S ratio affects treatment performance, sludge production, and microbial composition. The treatment performance is characterized in terms of organics removal efficiency, removal rate, and effluent quality. In addition, mass flow rates of Fe and S are estimated for understanding the biogeochemical transformations of the elements throughout the treatment system. Microbiological analyses are performed to elucidate the relationship between microbial communities and both treatment performance and sludge production.

This invention provides a wastewater treatment method that provides multiple energy and environmental benefits over the existing wastewater technologies that are known to date. The benefits include energy efficiency, excellent phosphorus removal/recovery, low biological sludge yield, low greenhouse gas emission, and generation of useful by-product from the sludge materials (magnetite). There is more than 50% reduction in electricity consumption in the present method compared to existing activated sludge systems. The present method removes organics from the wastewater and has far better efficiency in removing phosphorus (one of the major nutrients discharged from wastewater treatment plants). The method, for example, uses iron-containing wastes (e.g., acid mine drainage "AMD" sludge) as an electron acceptor for organics oxidation rather than oxygen for aerobic biological treatment methods. The present invention addresses AMD sludge disposal, wastewater treatment, and eutrophication/hypoxia control in receiving waters. Current wastewater treatment processes require aeration for biological removal of organics and aeration operation represents 50-75% of electricity consumption of a wastewater treatment plant. Further, nutrients in the treatment effluents from current wastewater treatment plants are a main contributor to eutrophic condition in receiving waters. In contrast, the present invention provides a method for wastewater treatment that does not require aeration and thus, avoids such operating costs because of ferric iron dosing. In addition, the present method provides excellent phosphorus removal (almost 99%) and significant removal of nitrogen which alleviates hypoxia in the receiving waters. The method of this invention provides low biological sludge yield and low greenhouse gas emission.

In one embodiment of this invention, a method is provided that comprises dosing of ferric iron to wastewater. The ferric iron may be any iron containing materials, including for example, but not limited to, commercially available iron chemicals ($FeCl_3$) and those extracted from waste materials from other industrial sectors such as acid mine drainage ("AMD") and the steel industry.

Figure 7:
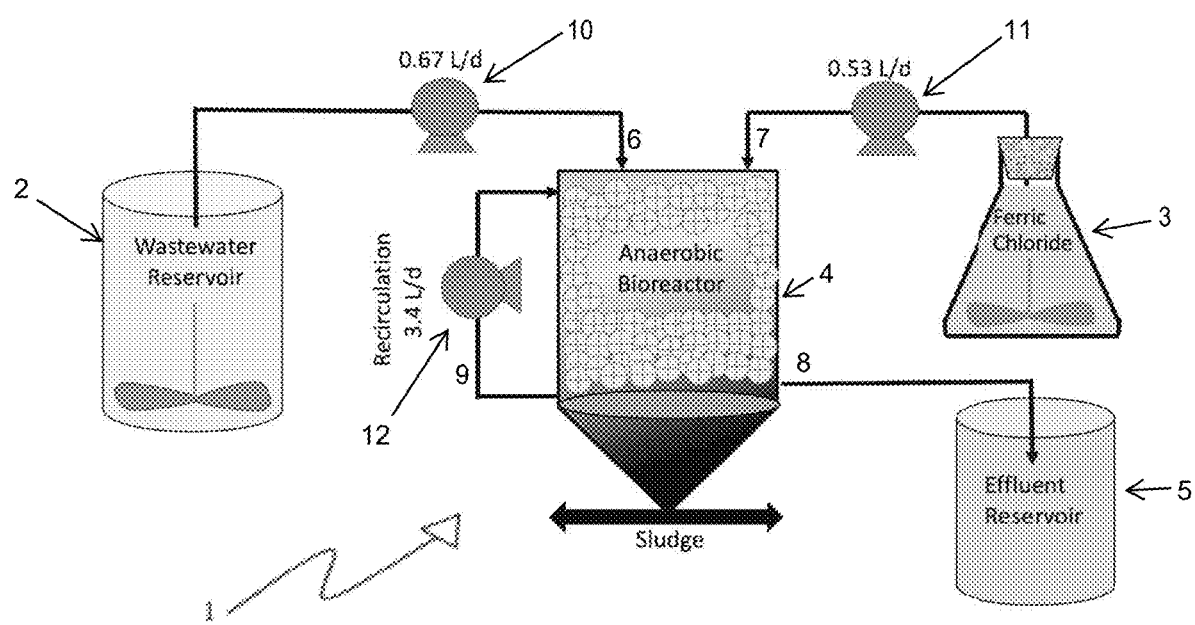
FIG. 7 shows one example of the setup of the process of this invention for the Fe(III)-dose treatment system.

FIG. 7 shows a schematic of an embodiment of this invention. The wastewater flow may be derived from domestic, municipal, and industrial sources that contain a wide range of materials that are typically characterized by the water's physical properties, and its chemical and biological constituents. The principal constituents of concern in wastewater treatment include, but are not limited to, suspended solids (SS), biodegradable organics (BO), pathogens, nutrients, heavy metals, and other priority pollutants. The bioreactor is packed with packing media for attached growth of microorganisms that facilitate organics oxidation coupled to ferric and sulfate reduction. The main microorganisms enable the wastewater treatment include iron reducing bacteria ("IRB"), sulfate reducing bacteria ("SRB"), and fermentative bacteria. For example, the bioreactor is first inoculated by sludge from anaerobic digesters at municipal wastewater treatment plants, and sludge of an acid mine drainage (AMD) source. The biomass of microorganisms is then enhanced in an extended time period (e.g., from about 3 to 6 months) in which the mixture of the wastewater and iron solution are periodically fed to the bioreactor. During this enrichment feeding, the bioreactor was maintained in an anaerobic condition by nitrogen gas sparging during sample handling and by ensuring air-tight seal of the bioreactor. After the biomass enrichment, the bioreactor is operated for treatment of the wastewater flow during which iron solution is dosed accordingly to sufficiently treat the wastewater flow to meet target treatment goals, as described herein. During the treatment, sludge is produced by the bioreactor and collected at the bottom of the reactor. The sludge contains both organics (i.e. biomass) and inorganics which is mostly ferrous sulfides. This method of anaerobic biological treatment of wastewater provides sufficient ferric iron such as iron together with sulfate in the wastewater for IRB and SRB to effectively facilitate organics oxidation. The iron dose is determined based on the organics and sulfate concentrations in the wastewater and its flow rate. In a preferred embodiment of this method, the Fe/S molar ratios are greater than or equal to two (Fe:S molar ratio ≥2) for better organics removal kinetics. The concentration of ferric iron and sulfate used depends on the organics concentration. Both the wastewater and iron flows are directly fed to and mixed in the bioreactor for wastewater treatment. The pH in the bioreactor is maintained in circumneutral pH range under an anaerobic condition to create an environment conducive for the microbial reactors. Internal recirculation at a flow rate, for example, of five times (5×) of the mixture flow of the wastewater and iron solution is used to promote mixing of the fluid in the bioreactor for better organics removal. The organic removal is to meet the discharge limit specified in the National Pollution Discharge Elimination System ("NPDES") permit (e.g., BOD 30 mg/L). The sludge materials are continuously or periodically removed from the bioreactor and can be further processed to generate useful byproducts, such as for example, magnetite particles.

In another embodiment of this invention, a thermal treatment method is provided to convert the sludge materials into a product that has magnetic properties and effectiveness for phosphorus retention. The magnetic by-product can be used as a sorbent for phosphorus removal in a wide range of applications.

FIG. 7 shows an example of the wastewater treatment system and process of this invention, in particular, a wastewater treatment system (1) comprising a wastewater reservoir (2), a ferric iron solution reservoir (3), an anaerobic bioreactor (4), and an effluent reservoir (5), wherein the wastewater reservoir (2) is connected to the anaerobic bioreactor (4) via a first port (6), wherein the ferric iron solution reservoir (3) is connected to the anaerobic bioreactor (4) via a second port (7), and wherein the effluent reservoir (5) is connected to the anaerobic bioreactor (4) via a third port (8), and wherein the anaerobic bioreactor (4) contains one or more of an iron reducing bacteria and one or more of a sulfate reducing bacteria, and a fourth port (9) for providing internal recirculation within said anaerobic bioreactor, a first pump (10) in communication with the first port (6) for feeding a wastewater from the wastewater reservoir (2) to the anaerobic bioreactor (4), a second pump (11) in communication with the second port (7) for feeding a ferric iron solution from the ferric iron solution reservoir (3) to the anaerobic bioreactor (4), a third pump (12) in communication with the fourth port (9) for providing internal recirculation of the wastewater within the anaerobic bioreactor (4). In another embodiment of the wastewater treatment system of this invention includes wherein the bioreactor contains one or more of an iron reducing bacteria, one or more of a sulfate reducing bacteria, and one or more of a fermentative bacteria. Fermentative bacteria are know by those persons skilled in the art. Fermentative bacteria use organic molecules as electron acceptor to produce fermentation end-products. Fermentative bacteria are, for example, but not limited to, *Streptococcus, Lactobacillus*, and *Bacillus*, to name a few that produce lactic acid.

In another embodiment of this invention, a wastewater treatment system is provided, as described herein, wherein the iron containing solution is selected from the group consisting of ferric chloride, acid mine drainage, and an electron acceptor for organic oxidation that is not oxygen.

Another embodiment of this invention provides a method for treating wastewater comprising adding a sulfate containing wastewater and an effective amount of a ferric iron containing solution to an anaerobic bioreactor wherein the anaerobic bioreactor is a vessel that has a top, a bottom, and one or more side walls, and one or more ports for entry of one or more influents and exit of one or more effluents, and providing the anaerobic bioreactor with one or more of an iron reducing bacteria and one or more of a sulfate reducing bacteria, and one or more of a fermentative bacteria, to form a mixture in the anaerobic bioreactor of the sulfate containing wastewater, the ferric iron containing solution, the iron reducing bacteria, the sulfate reducing bacteria, and the fermentative bacteria; maintaining an anaerobic condition in the anaerobic bioreactor; adjusting a dosage of the ferric iron containing solution to the mixture in the anaerobic bioreactor to achieve a Fe/Sulfate molar ratio that is equal to or greater than 0.50; providing an internal recirculation of the mixture in the anaerobic bioreactor; maintaining a neutral pH of the mixture in the anaerobic bioreactor; producing a sludge at the bottom of the anaerobic bioreactor; and removing an effluent from the anaerobic bioreactor that is a treated wastewater. Optionally the method of this invention includes removing the sludge from the bottom of the anaerobic bioreactor.

In the methods of treating a sulfate wastewater of this invention, the sulfate containing wastewater is derived from domestic, municipal, and industrial sources. This sulfate containing wastewater includes suspended solids, biodegradable organics, pathogens, nutrients, heavy metals, and pollutants.

In another embodiment of the method of this invention, as described herein, includes increasing the ferric iron dosing of the mixture in the anaerobic bioreactor to affect an enhanced organic component removal and oxidation kinetics.

In another embodiment of this method as described herein, includes increasing the ferric iron dosing to affect a lowering of a sulfide level in said effluent through forming iron sulfide precipitates.

In another embodiment of the method of this invention, as described herein, includes increasing a chemical oxygen demand removal.

In a preferred embodiment of the method of treating a sulfate wastewater, as described herein, includes wherein the iron reducing bacteria is selected from the group consisting of *Geobacter* sp., *Ignavibacteria* sp., and *Geothrix* sp.

In a preferred embodiment of the method of treating a sulfate wastewater, as described herein, includes wherein the sulfate reducing bacteria is selected from the group of *Desulfovibrio* sp., *Desulfobulbus* sp., *Desulfatirhabdium* sp, *Desulforhabdus* sp., and *Desulfomonile* sp.

In another embodiment of the method of treating a sulfate wastewater of this invention, as described herein, includes wherein the ferric iron containing solution is selected from the group consisting of ferric chloride, acid mine drainage, and an electron acceptor for organic oxidation that is not oxygen.

Materials and Methods

Bench-Scale Iron-Dosed Treatment System

The treatment system of this invention comprises a wastewater tank, a ferric iron solution reservoir, a bioreactor and an effluent collection tank (Supplementary Material, FIG. S1).

Wastewater Tank

A 4-L bottle was used as the wastewater tank in the treatment system. A solution containing sodium acetate anhydrous ($C_2H_3NaO_2$, 3 mM), 1.54 mM ethanol ($C_2H_6O$, 1.54 mM), lactose monohydrate ($C_{12}H_{22}O_{11} \cdot H_2O$, 0.32 mM), sodium bicarbonate ($NaHCO_3$, 1.57 mM), and trace elements (4.75 mL/L) [20] was prepared as a synthetic wastewater in this study. This synthetic wastewater was used as a base solution to maintain a consistent level of organics (COD=420 mg/L). A sodium sulfate solution ($Na_2SO_4$) was used to adjust the sulfate concentration in the wastewater for different Fe/S ratios.

Ferric Chloride Reservoir

A 2-L tank containing a ferric chloride solution ($FeCl_3 \cdot 6H_2O$, 1.32 mM, 2.50 mM and 4.50 mM) was used to feed ferric iron to the bioreactor to obtain Fe/S molar ratio 0.5, 1 and 2 respectively. The ferric solution pH was adjusted to 4-4.2 using a sodium hydroxide solution (NaOH, 5N).

Bioreactor

The bioreactor (1.4 L) was made of acrylic cylinder with ports on the top for wastewater and ferric iron inflows. Two ports on the side of the reactor were used for internal recirculation to enhance hydraulic mixing in the reactor. The reactor was packed with five hundred plastic media (Evolution Aqua Ltd., UK, Kaldness K1 Biomedia, specific surface area=500 $m^2/m^3$) for attached growth of microorganisms, resulting in a working volume of 0.9 L in the reactor. A perforated acrylic plate was used to support the packing media and a cone-shaped bottom was used for sludge settling and collection. The reactor was first inoculated with anaerobic sludge from a wastewater treatment plant (Star City, West Virginia) and acid mine drainage (St. Thomas, Morgantown, West Virginia) at 1:1 volume ratio. The bioreactor was bubbled with $N_2$ gas regularly prior to the operation and sealed airtight to maintain an anaerobic condition. The bioreactor was operated at room temperature and given three-month enrichment period with continuous feeding of the synthetic wastewater and pre-calculated amounts of sulfate and ferric iron to obtain Fe/S molar ratio 0.5.

Treatment Experiments

The treatment performance was evaluated under three different target Fe/S molar ratios (0.5, 1, and 2) while maintaining the same total equivalent concentration of Fe(III) and sulfate (Table 1). The bioreactor was operated continuously for 500 days, during which the flow rates of influent (0.67 L/d), ferric solution (0.53 L/d), and internal recirculation (3.4 L/d) were kept constant. During the treatment, the ferric chloride and sulfate loadings to the bioreactor were varied to obtain the three target Fe/S molar ratios. The total equivalent concentration of the electron acceptors was maintained the same for all three Fe/S molar ratios (11.9 mN/d) to have the same total reducing capacity for organic matter oxidation.

TABLE 1

Daily loads of Fe and S for three target Fe/S molar ratios

| Fe/S molar ratio | Fe loading (mmol/d) | S loading (mmol/d) |
|---|---|---|
| 0.5 | 0.70 | 1.40 |
| 1 | 1.32 | 1.32 |
| 2 | 2.38 | 1.19 |

Before changing the ratio of Fe/S, all solutions and sludges were removed from the bioreactor and replaced with fresh synthetic wastewater. Under each Fe/S molar ratio, the first month was allowed for microorganisms to adapt to the chemical condition and to reach a steady state and treatment in the following three months was considered under the steady state condition. The influent and effluent samples were collected daily and later intermittently for COD, sulfate, total iron, sulfide and ferrous iron analyses. All samples were stored at 4° C. until analysis except sulfide and ferrous iron samples which were analyzed immediately to avoid oxidation. Influent and effluent COD, sulfate and total iron concentrations were used to estimate the COD removal efficiency, sulfate reduction and total iron retention. In this study, iron retention is referred to iron retained in the bioreactor and the sludge. COD removal rate was calculated using the influent and effluent COD concentrations under the steady-state condition [24]. The sludge samples were collected monthly for solid measurements, microscopic and microbiological analyses.

Analytical Methods

Standard methods were used for all the chemical analyses [25]. A pH meter (AB15 Plus, Fisher Scientific) was used to measure the pH of wastewater and ferric solution. COD concentration was measured by following a closed reflux, colorimetric method (Standard Method 5220 D) using a spectrophotometer (HACH, DR 2800). Soluble sulfate concentration was measured by a turbidimetric method (USEPA method 375.4) using a spectrophotometer (Thermo Scientific, GENESYS 10UV). Total iron concentration was measured with an atomic absorption spectrophotometer (Perkin Elmer 3100) after the samples were acidified with a 70% nitric acid (HNO3) solution. Ferrous iron concentration was determined using 1, 10 phenanthroline method (Standard Method 3500 B) and ferric iron concentration was calculated by the differences between the total and ferrous iron concentrations. Sulfide concentrations were measured by a methylene blue method (Standard Method 4500 D) using a HACH spectrophotometer (DR 2800). An optical emission spectrometer (Optima 2100 DV) was used to estimate the total sulfur in the sludge sample after acidified with a 70% $HNO_3$ solution.

Sludge Characterization

After running the treatment experiment under each Fe/S molar ratio, the accumulated sludge material was collected from the bioreactor for physical, chemical and biological characterization. Total suspended solid (TSS), volatile suspended solid (VSS), and non-volatile suspended solid (NVSS) in the sludge materials were measured (Standard Method 2540). A scanning electron microscope (SEM) equipped with an energy dispersion spectroscopy (SEM-EDS, Hitachi S 4700) was used to study the morphological and elemental composition of the sludge. After collecting from the bioreactor, the sludge samples were dried in a closed desiccator filled with calcium sulfate and flushed with $N_2$ gas to prevent sludge oxidation. The powdered samples were mounted on aluminum stubs and coated with Au—Pd to avoid surface charging. The SEM scanning was performed under an accelerating voltage of 10-20 kV and qualitative elemental analysis of the sludge samples was conducted by EDS spectrometry under an accelerating voltage of 10 kV. Biological fixation of the sludge sample was done to take SEM photographs of the microorganisms.

The powdered sludge samples were also used to determine the chemical states of Fe and S by X-ray photoelectron spectroscopy (XPS) analysis (PHI 5000 Versaprobe). The sample powder was mounted on a sample holder with a zero reflective quartz plate (MTI corporation, CA) located underneath. XPS spectra were obtained with a monochromatized Al Kα X-ray source (1487 eV) while base pressure of the analytical chamber was on the order of $10^{-7}$ Pa. A pass energy of 23.5 eV was used to conduct elemental scans of Fe and S. X-ray diffraction (XRD) analysis was conducted to determine the crystallinity of the sludge samples using an X-ray diffractometer (PANalytical X'Pert Pro). The samples were prepared by separating the sludge particles from the solution using high-speed centrifugation (5000×g) for 10 minutes. The XRD analysis was performed with a Cu Kα X-ray source operated under 45 kV and 40 mA.

Microbiological Analysis

A DNeasy Powersoil DNA extraction kit (Qiagen, Maryland, USA) was used to extract the DNA from sludge samples and a Qubit fluorometer (Invitrogen, Carlsbad, CA, USA) was used for quantification. The bacterial/archaeal primer set 515F/806R that targets the V4 region of the gene was used to sequence the 16S rRNA genes in the extracted DNA at Argonne National Laboratory. Resulting reads were checked for chimeras (DADA2) and subsequently clustered into exact sequence variant (ESV) classifications at 100% similarities using the DADA2 tool in the QIIME2 pipeline (Qiime2-2018.4) and SILVA 16S rRNA gene database. Sequences used in this study have been deposited in the NCBI Sequence Read Archive under accession number PRJNA528092.

Results and Discussion

Treatment Performance

Acclimation to New Fe/S Ratios

Figure 8:
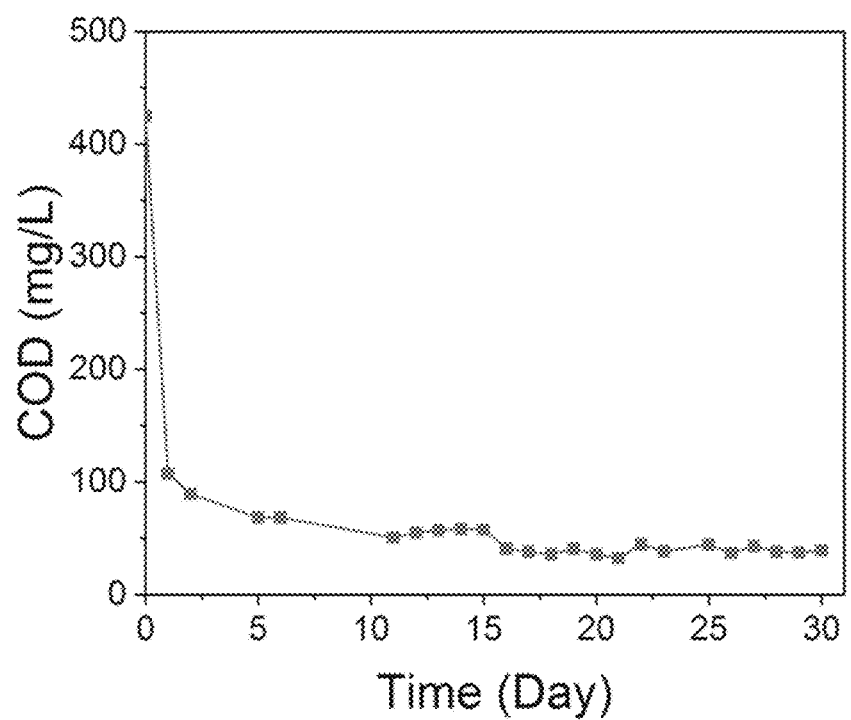
FIG. 8 shows the COD concentration of the treated effluent under Fe/S ratio 2 for microbial acclimation evaluation of this invention.
Figure 9:
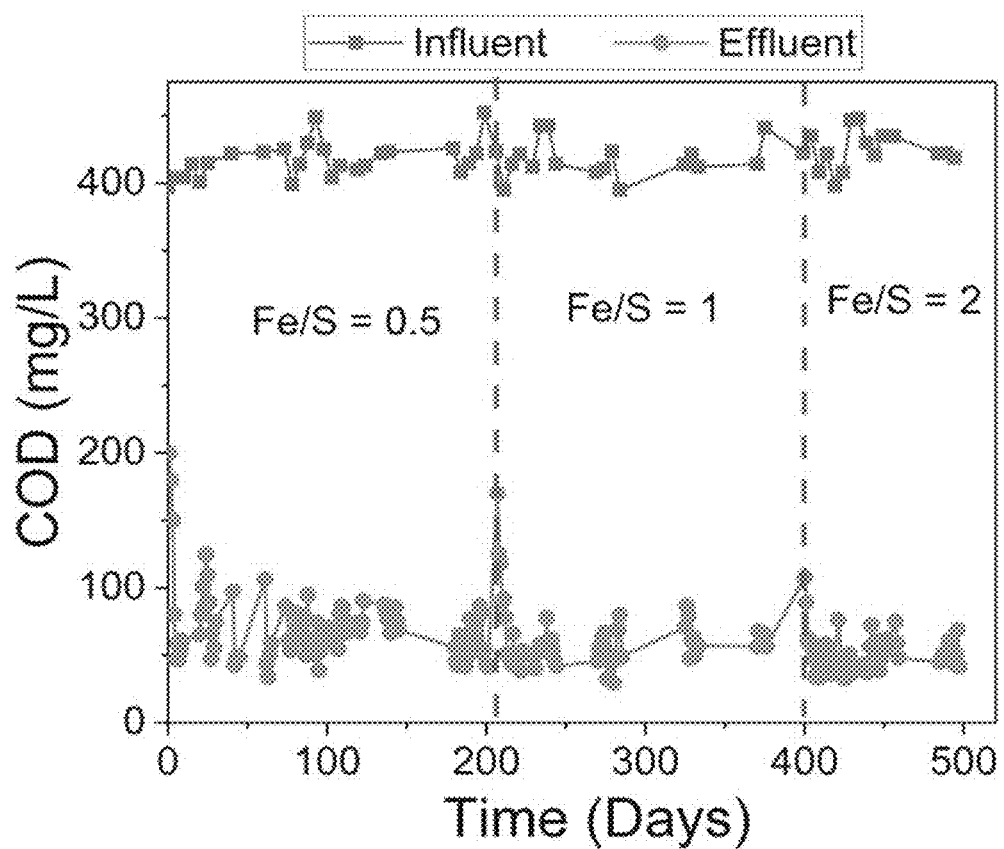
FIG. 9 shows COD concentration of treated effluent from the Fe(III)-dosed biological system of this invention.

Acclimation of the bioreactor to a new Fe/S ratio was evaluated by monitoring COD concentration periodically to determine when a steady state could be reached. COD concentration was observed to stabilize after approximately 23 days (see FIG. 8). A one-month acclimation period was therefore given before regular sampling of the influent and effluent to evaluate the treatment performance under each Fe/S ratio.

COD Removal, Sulfate Reduction and Iron Retention

The bioreactor was found to provide fairly consistent treatment for COD removal during the study (Supplementary material, FIG. S3). The average COD removal efficiencies were 84±4%, 86±4% and 89±2% for Fe/S ratios of 0.5, 1 and 2, respectively (see FIG. 1(a)). The COD removal increased slightly with Fe/S ratio showing the effect of increasing Fe(III) dosing on the organics oxidation. Sulfate reduction and iron retention also followed an increasing trend with the Fe/S ratio (see FIG. 1(a)). Higher than 90% sulfate reduction and close to 100% iron retention under all the Fe/S ratios indicated that both ferric iron and sulfate reduction played a significant role in COD oxidation.

COD Oxidation Kinetics

Figure 1B:
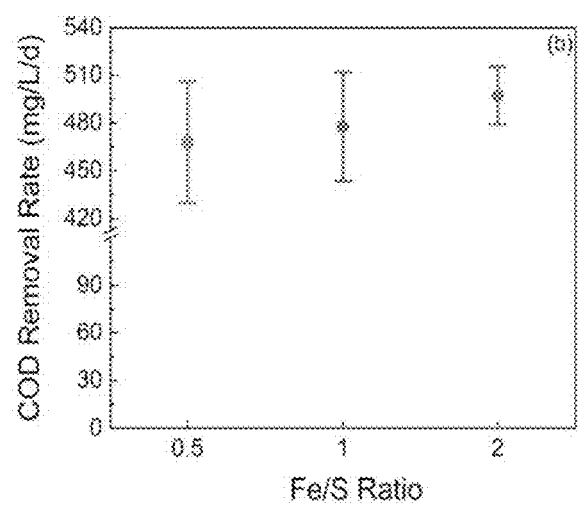

The COD removal rates were calculated as 468±25 mg/L/d, 478±23 mg/L/d and 497±12 mg/L/d for Fe/S ratio 0.5, 1 and 2 respectively see (FIG. 1(b)). The increasing removal rate was attributed to evolving microbial community in the bioreactor that facilitated faster organics oxidation resulting from the increased ferric loadings. The result shows how Fe/S ratio can be used to regulate organic oxidation rates in the Fe(III)-dosed treatment system of this invention.

Effluent Quality

Mean total iron concentrations of the 200 effluent samples were observed as 1.6±0.6, 1.6±0.5 and 2.2±0.8 mg/L under Fe/S ratio 0.5, 1 and 2, respectively. Soluble ferrous iron was consistently low under all Fe/S ratios with mean concentrations ranging from 0.02-0.05 mg/L. Sulfide concentrations were higher under Fe/S ratio 0.5 (0.42±0.3 mg/L) and decreased to 0.04±0.1 and 0.03±0.02 mg/L as the ratio increased to 1 and 2, respectively (see FIG. 2(a)). These results indicated that under Fe/S molar ratio 0.5, ferrous iron produced from ferric reduction was insufficient to precipitate out all the biogenic sulfide. Under the two higher Fe/S molar ratios (1 and 2, respectively), sufficient amounts of ferrous iron were produced to precipitate out soluble sulfide. The residual iron represented a small fraction (2%, 1%, and 0.8% for Fe/S ratios 0.5, 1 and 2, respectively) of the iron dose, and mostly was in the form of ferric iron. The residual ferrous iron and sulfide in the effluent represent an oxygen demand and can be oxidized by chlorine in a disinfection unit [26,27]. The resultant ferric iron is expected to form a hydroxide solid which can be removed by sedimentation or filtration before discharge of the effluent to the environment.

The influent pH (8.0±0.1) was consistently lowered to those in the effluent as a result of the biological treatment (see FIG. 2(b)), which was attributed partly to addition of the ferric iron solution (pH 4-4.2) to the bioreactor. The pH trend also suggests a positive correlation between net acidity production and the Fe/S molar ratio. This is supported by previous studies that showed production of acidity from organic carbon oxidation was higher than alkalinity generation by ferric iron reduction [28-30].

Mass Balance of Fe and S in the Bioreactor

A mass balance was performed on Fe and S under Fe/S molar ratio 2 to understand the chemical flows throughout the biological treatment. In the influent, sulfur (S) was in the dissolved form (38.2 mg/d) and iron (Fe, 134.3 mg/d) was in suspended flocs (pH 4-4.2). During this operation, total 50 samples used for mass balance calculations showed that only 1.3% of the total S load and 2% of the total Fe load were discharged through the effluent. On the other hand, 69% of the total S load and 48% of the total Fe load was accounted as particulates in the sludge sample (see FIG. 3). FIG. 3 shows mass flow rates of Fe and S throughout the biological treatment under Fe/S molar ratio 2 of this invention. This high Fe and S content of sludge samples were due to ferrous sulfide precipitation. The remaining chemical masses were calculated as unaccounted fractions that can be recognized by several possible mechanisms, including iron sulfide precipitation retained in the bioreactor, evaporative loss of sulfide or some loss during sampling and sample preparation for chemical analyses [24]. This mass balance of Fe and S revealed that, most of the fed Fe and S formed chemical precipitates as a result of the biogeochemical transformations occurring in the bioreactor and only a small fraction of the elements was discharged in the effluent.

Sludge Characterization

Solid Concentrations

Figure 4:
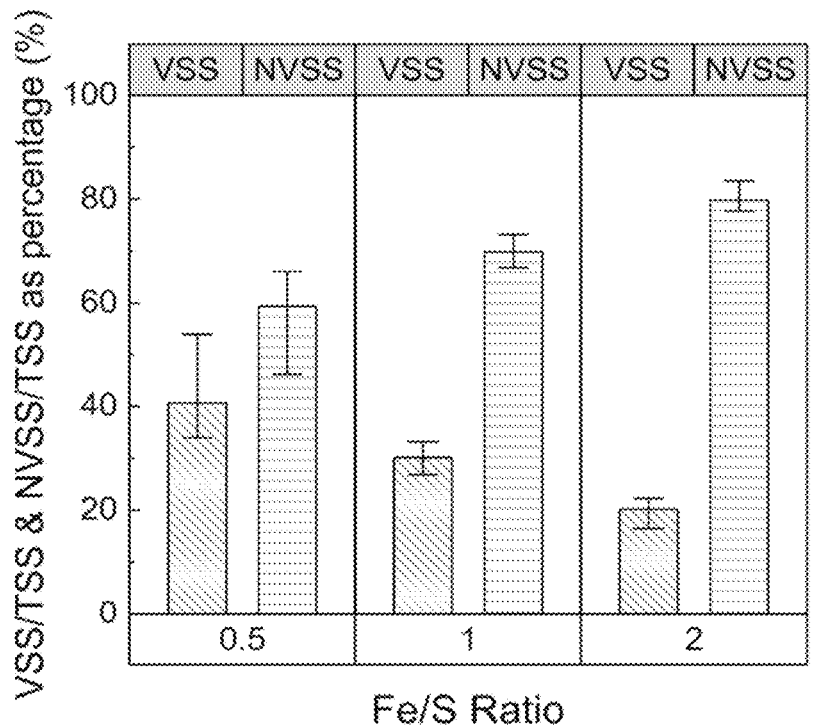
FIG. 4 shows VSS/TSS and NVSS/TSS as percentage (%) of sludge samples under different Fe/S molar ratios.

Mean TSS concentration of the sludge samples ranged from 1,341-21,946 mg/L. The mean TSS concentration increased with the Fe/S ratio, indicating an increase in the sludge production under the higher Fe/S ratios compared to Fe/S molar ratio 0.5. The solid analyses showed that the mean VSS/TSS decreased from 40% to 20% and correspondingly the mean NVSS/TSS increased from 60% to 80% as Fe/S molar ratio increased from 0.5 to 2 (see FIG. 4). This revealed that most of the solids were inorganic materials and the inorganic fraction of the solids increased with the Fe/S molar ratio. These results showed the range of volatile fractions of the sludge samples (0.2-0.4) and their corresponding nonvolatile fractions (0.8-0.6) resulting from this treatment and their fluctuations under different dosing scenarios. The increasing inorganic fraction of the sludge solid with the Fe/S molar ratio indicated more iron sulfide production with increasing iron dosing. FIG. 4 shows the VSS/TSS and NVSS/TSS as percentage (%) of sludge samples under different Fe/S molar ratios.

Sludge Morphology

SEM-EDS analysis in this study revealed major elements of the sludge sample as carbon (C), oxygen (O), Fe, and S (see FIG. 10(a) and FIG. 10(b)). The small grains observed in the SEM image (FIG. 10(a)) were recognized as the precipitate particles which had a very disordered morphology with no specific pattern. The small sizes (1-2 μm) of the sludge particles as spherical aggregates were in line with the structural descriptions of iron sulfide presented in previous studies [31-33].

SEM images taken after the biological fixation of sludge samples revealed the presence of various microbial cells in the sludge. Majority of the observed microorganisms were rod shaped and curved, and had an approximate length of 2-3 μm (see FIG. 10(c)). The size and shape observed in these images were similar to those in the previous studies describing the physical characteristics of *Geobacter* sp. [34,35] and *Desulfovibrio* sp. [36]. Cells were observed to be in high density.

Sludge Composition

Figures 5, 5B:
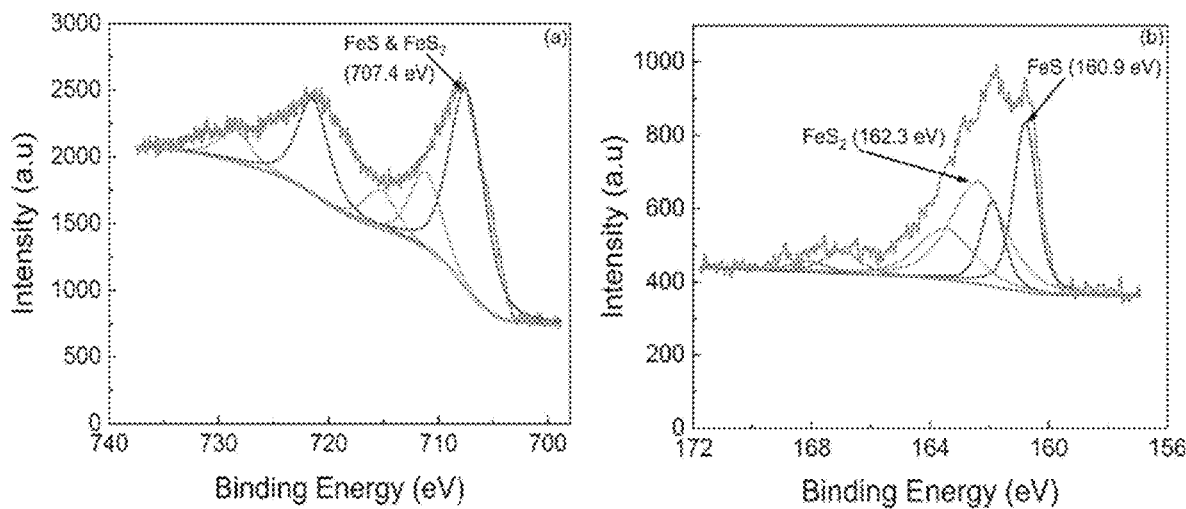
FIG. 5(*a*) shows XPS spectrum of Fe2p region of a sludge sample.

XPS analysis showed that two different iron sulfide forms, FeS and $FeS_2$, were the major inorganic constituents of the sludge samples. FIG. 5(a) shows XPS spectrum of Fe2p of a sludge sample, and FIG. 5(b) shows XPS spectrum of S2p region of a sludge sample. The narrow region in the spectrum of Fe2p revealed a major peak at 707.4 eV (see FIG. 5(a)), which represents both FeS and $FeS_2$. As the binding energies of FeS and $FeS_2$ are very similar, it is often difficult to separate the peaks of these two different forms in an Fe2p spectrum [37,38]. However, the S2p spectrum was fit with two distinct peaks at 160.9 eV and 162.3 eV, in agreement with the typical binding energies of FeS and $FeS_2$ respectively (see FIG. 5(b)) [39,40].

Sludge Crystallinity

Figure 11:
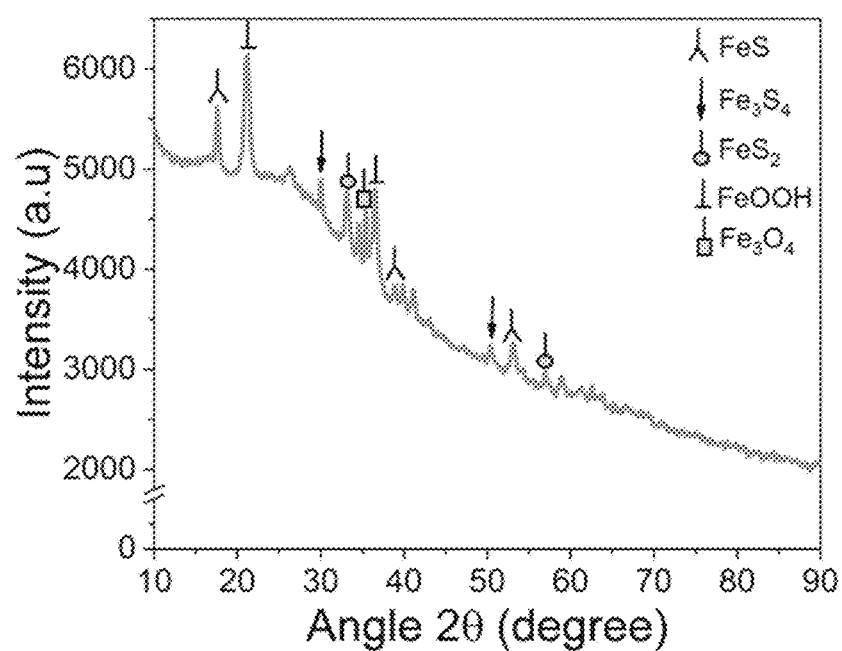
FIG. 11 shows a XRD spectrum of anaerobic sludge material (Fe/S molar ratio 2).

An XRD spectrum of the sludge samples showed sharp peaks representing crystalline forms of FeS (mackinawite), $FeS_2$ (pyrite), $Fe_3S_4$ (greigite), FeOOH (goethite), and $Fe_3O_4$ (magnetite) (see FIG. 11). However, the low intensity of the sharp peaks and dominant presence of broad hump peaks suggest that most of the sludge samples were in an amorphous form. Biogenic sludge generally precipitates as amorphous FeS, which may be transformed to stable crystalline form of FeS and $FeS_2$ under a long-term operation. Greigite (Fe3S4) was considered an intermediate iron sulfide form between the transformation of amorphous FeS to well crystallized $FeS_2$ in anaerobic environments [33,41]. Therefore, the sludge precipitates can be described as a mixture of both amorphous and crystalline iron sulfides with amorphous phases being prevailing. Crystallographic information of the obtained peaks revealed tetragonal crystal structure of FeS and cubic structure of $FeS_2$ and $Fe_3S_4$.

Sharp peaks of FeOOH represent crystalline ferric oxyhydroxides that occurred due to the surface oxidation of ferrous sulfide. The presence of Fe3O4 (magnetite) can be attributed to biologically-induced mineralization (BIM) in which microbes sorb solutes onto their cell surface or extrude organic polymers resulting in mineral formation [42]. *Geobacter* sp. has been reported to produce magnetite extracellularly through BIM during FeOOH reduction [43]. Magnetite can be a very useful element because of its physical properties and various heat treatments have been investigated for generating magnetite from iron sulfide [13, 15]. These results suggest the sludge produced in this Fe(III)-dosed biological treatment can potentially be further processed for beneficial applications.

Microbiological Composition

Dominant ESVs identified in the sludge samples belonged to ten different phyla, including members of the Alphaproteobacteria, Deltaproteobacteria, Gammaproteobacteria, Acidobacteria, Bacteroidetes, Chloroflexi, Firmicutes, Spirochaetes, Actinobacteria and Euryarchaeota. The average relative abundances of these phyla are listed in Table 2.

*Ignavibacteria* sp. and *Geothrix* sp. comprised 15% and 2% relative abundance of the total IRB respectively, and likely contributed to the ferric reduction in the bioreactor (see FIG. 6(*a*)). Similar to *Geobacter*, *Ignavibacteria* has been observed to grow well in acetate-amended incubations [47]. Due to the insolubility of ferric compounds at the pH range 7-8 in the bioreactor, these IRBs perform the ferric reduction either by direct contact with outer-membrane cytochromes or via conductive pili structures. In addition, *Geothrix* is able to produce chelators that solubilize Fe(III) and release electron-shuttling compounds for the microbial interaction of Fe(III) surface with cell structure [46]. FIG. 6(*a*) shows microbial distribution of putative IRB and SRB and FIG. 6(*b*) shows relative abundances of iron reducing bacteria (IRB) and sulfate reducing bacteria (SRB).

*Desulfovibrio* sp., *Desulfobulbus* sp., *Desulfatirhabdium* sp., *Desulforhabdus* sp., *Desulfomonile* sp. were the major putative SRB observed in the bioreactor and comprised 38%, 30%, 21%, 8% and 2% relative abundance of the total SRB respectively (FIG. 6(*a*)). All these gram-negative SRB belong to the Deltaproteobacteria phyla, and previously

TABLE 2

Major bacteria and their phylum identified in the bioreactor

| Deltaproteobacteria | Acidobacteria | Bacteroidetes | Gammaproteobacteria | Actinobacteria |
|---|---|---|---|---|
| *Geobacter* sp. (22%) | *Geothrix* sp. (0.5%) | *Ignavibacteria* sp. (4%) | *Methylomonas* sp. (0.2%) | *Cellulomonas* sp. (0.1%) |
| *Desulfobulbus* sp. (4%) | | *Paludibacter* sp. (2%) | *Azospira* sp. (0.04%) | |
| *Desulfovibrio* sp. (5%) | | | *Azobacter* sp. (0.1%) | |
| *Desulfatirhabdium* sp. (3%) | | | | |
| *Desulforhabdus* sp. (1%) | | | | |
| *Desulfomonile* sp. (0.2%) | | | | |
| *Syntrophobacter* sp. (2%) | | | | |
| *Smithella* sp. (0.2%) | | | | |

| Firmicutes | Chloroflexi | Alphaproteobacteria | Spirochaetes | Enryarchaeota |
|---|---|---|---|---|
| *Clostridium* sp. (4%) | *Anaerolineae* sp. (4%) | *Pleomorphomonas* sp. (7%) | *Treponema* sp. (6%) | *Methanosaeta* sp. (2%) |
| *Ruminiclostridium* 1 (0.04%) | | | *Brevinema* sp. (2%) | |
| *Veillonellaceae* sp. (1%) | | | | |

Although caution must be taken when assigning functional roles to identified taxa from 16S rRNA gene data, some inferred conserved functions may be assigned based on laboratory studies of model microorganisms within specific taxonomic groups. *Geobacter* sp., *Geothrix* sp. and *Ignavibacteria* sp. were classified as IRB, and *Desulfovibrio* sp., *Desulfobulbus* sp., *Desulfatirhabdium* sp., *Desulforhabdus* sp. and *Desulfomonile* sp. were classified as SRB based on this concept. The ability of *Geobacter* sp. and *Geothrix* sp. to perform ferric reduction has been observed in laboratory studies [35, 44-46]. *Ignavibacteria* sp. was recently identified to facilitate iron reduction as well [47,48]. With 83% relative abundance of the total identified IRB, *Geobacter* sp. was inferred to perform the majority of iron reduction in the bioreactor (see FIG. 6(*a*)). The dominancy of *Geobacter* sp. can be linked with presence of acetate as one of the major organic compounds in synthetic wastewater. *Geobacter* sp. typically oxidize small organic substrates such as acetate to CO2, coupled to iron reduction [22,23,49].

have been shown to use sulfate as electron acceptor, which is subsequently reduced to sulfide [50-54]. *Desulfovibrio* sp. and *Desulfobulbus* sp. can catalyze incomplete oxidation of larger organic substrates such as lactate, yielding acetate which can subsequently be used by other IRB and SRB (i.e. *Desulfatirhabdium* sp. and *Desulforhabdus* sp.) as an electron donor [50,51]. Characterized representatives of the putative SRB identified here are mesophilic, growing well under moderate temperatures (20-45° C.) and circumneutral pH.

In terms of relative abundances, IRB were observed to be the dominant functional group over SRB under all the Fe/S molar ratios. In general, IRB have a competitive edge over SRB for organic substrate utilization due to the thermodynamically favorable redox reactions with ferric iron. The relative abundance of putative IRB was 17%, 27% and 39% for Fe/S 0.5, 1 and 2, respectively (FIG. 6(*b*)), indicating a positive correlation of IRB with COD removal as organic oxidation was also improved with increasing Fe/S molar ratio. Although sulfate concentrations decreased slightly with the increasing Fe/S ratio, the relative abundances of putative SRB increased from 12% to 16%. A major reason may be the presence of both *Desulfovibrio* sp. and *Desulfobulbus* sp. as the dominant SRB in the bioreactor. Both of the taxonomic groups have been observed to grow well under iron reducing conditions, and perform enzymatic Fe(III) reduction [55-57]. Therefore, the possibility exists that these SRB were also performing ferric reduction under higher Fe/S ratios, and concurrently increasing in relative abundance.

In addition to IRB and SRB, many other bacteria were also detected in the bioreactor. Comparatively low abundance of methanogens, *Methanosaeta* sp. (2%) in the bioreactor suggests that IRB and SRB out-competed methanogens for substrate utilization. Bacteria previously characterized as fermenters, such as *Clostridium* sp., *Treponema* sp., and *Paludibacter* sp. were present with average relative abundance of 4%, 6% and 2%, respectively. These fermentative bacteria can break the complex organic compounds into small organic substrates that can be easily utilized by IRB and SRB [58-60]. Some strains of *Clostridium* have previously been found to indirectly participate in dissimilatory Fe(III) reduction by disposing of reducing equivalents [61,62]. Anaerolineae ESVs were also identified within the bioreactor; members of this group are generally found in the anaerobic sludge granules of bioreactors [63].

Shannon's diversity index (H) was calculated as 3.26, 3.36 and 3.34 for Fe/S molar ratio 0.5, 1 and 2, respectively, and Simpson's diversity index was measured as 0.88, 0.92 and 0.92, respectively, for the same ratio values. These high values of diversity indices (higher than 2 for Shanonn's H and close to 1 for Simpson's index) reflect the diverse microbial community in the bioreactor [64,65]. Higher microbial diversity of the bioreactor at higher ratios may also support increase in functionality and tolerance level against environmental and chemical disturbances (e.g. temperature, electron donors) [66, 67].

Biological Fixation of Sludge Samples for SEM Photographs

A 6 ml sludge sample (as described above) was taken on a Microscope cover glass (Fisherbrand) and processes several steps of biological fixation to preserve the integrity of bacterial cell walls. The sample was washed with 2.5% Glutaraldehyde for one hour and rinsed three times with phosphate buffer saline (PBS) at 15-minute intervals. Then the sample was dehydrated with a series of ethanol solution at different concentrations (30%, 50%, 70%, 90%, 100%). This dehydration procedure was executed with gentle agitation for 15 minutes in each step. Then the ethanol was removed from the sample and dried with hexamethyldisilazane (HMDS) for another 15 minutes. This technique was applied to eliminate surface tension effects by raising the temperature of the sample above the critical temperature for $CO_2$ and reducing the distortion of morphology and surface structure (Nordstrom and Munoz, 1985)[64].

It will be understood by those persons skilled in the art that this invention provides for the operation of a continuous Fe(III)-dosed anaerobic biological treatment method and provides the Fe and S biogeochemical transformations in the context of the wastewater treatment. The Fe/S ratio was found to play a significant role in regulating major treatment aspects of the biological system of this invention including organics removal rate and efficiency, effluent quality, sludge production and microbial composition. For practical implementation of this treatment method, the iron dosing requirement is primarily to be determined by the organics and sulfate loads of the wastewater to provide sufficient electron acceptors for organics oxidation. The results showed increasing Fe(III) dosing resulted in enhanced organics removal rates and efficiency. Another beneficial outcome of higher iron dosing is that excessive quantity of ferrous iron can lower the sulfide level in the effluent through forming iron sulfide precipitates. This precipitation mechanism is significant because it eliminates toxicity and oxygen demand possibly caused by sulfide in the receiving water. The biogenic ferrous iron and sulfide primarily precipitated as amorphous FeS, which may undergo long-term transformations to crystalline FeS and FeS2. These sludge byproducts can directly be used for environmental remediation and wastewater treatment or for recovering valuable materials (e.g magnetite). The microbiological analyses indicated the presence of putative IRB and SRB along with fermentative bacteria in the bioreactor. Their known functional activities suggest synergistic relationships among these bacterial species in organics degradation.

REFERENCES

[1] Y. J. Chan, M. F. Chong, C. L. Law, D. G. Hassell, A review on anaerobic-aerobic treatment of industrial and municipal wastewater, Chem. Eng. J. 155 (2009) 1-18. doi:10.1016/j.cej.2009.06.041.

[2] J. B. Van Lier, F. P. Van der Zee, C. T. M. J. Frijters, M. E. Ersahin, Celebrating 40 years anaerobic sludge bed reactors for industrial wastewater treatment, Rev. Environ. Sci. Biotechnol. 14 (2015) 681-702. doi:10.1007/s11157-015-9375-5.

[3] M. H. R. Z. Damianovic, E. Foresti, Anaerobic degradation of synthetic wastewaters at different levels of sulfate and COD/sulfate ratios in horizontal-flow anaerobic reactors (HAIB), Environ. Eng. Sci. 24 (2007) 383-393.

[4] C. Hubert, G. Voordouw, Oil field souring control by nitrate-reducing Sulfurospirillum spp. that outcompete sulfate-reducing bacteria for organic electron donors, Appl. Environ.

[5] M. Ahmed, O. Lin, C. M. Saup, M. J. Wilkins, L.-S. Lin, Effects of Fe/S Ratio on the Kinetics and Microbial Ecology of an Fe(III)-dosed Anaerobic Wastewater Treatment System, J. Hazard. Mater. 369 (2019) 593-600. doi:10.1016/j.jhazmat.2019.02.062.

[6] M. Ahmed, L.-S. Lin, Ferric reduction in organic matter oxidation and its applicability for anaerobic wastewater treatment: a review and future aspects, Rev. Environ. Sci. Biotechnol. 16 (2017) 273-287. doi:10.1007/s11157-017-9424-3.

[7] Z. Zhang, Y. Wang, G. L. Leslie, T. D. Waite, Effect of ferric and ferrous iron addition on phosphorus removal and fouling in submerged membrane bioreactors, Water Res. 69 (2015) 210-222. doi:10.1016/j.watres.2014.11.011.

[8] N. Wang, T. Zheng, G. Zhang, P. Wang, A review on Fenton-like processes for organic wastewater treatment, J. Environ. Chem. Eng. 4 (2016) 762-787. doi:10.1016/j.jece.2015.12.016.

[9] T. D. Waite, Challenges and opportunities in the use of iron in water and wastewater treatment, Rev. Environ. Sci. Biotechnol. 1 (2002) 9-15. doi:10.1023/A:1015131528247.

[10] J. Kulandaivelu, J. Gao, Y. Song, S. Shrestha, X. Li, J. Li, K. Doederer, J. Keller, Z. Yuan, J. F. Mueller, G. Jiang, Removal of Pharmaceuticals and Illicit Drugs from Wastewater Due to Ferric Dosing in Sewers, Environ. Sci. Technol. 53 (2019) 6245-6254. doi:10.1021/acs.est.8b07155.

[11] Y. Yang, T. Chen, M. Sumona, B. Sen Gupta, Y. Sun, Z. Hu, X. Zhan, Utilization of iron sulfides for wastewater treatment: a critical review, Rev. Environ. Sci. Biotechnol. 16 (2017) 289-308. doi:10.1007/s11157-017-9432-3.

[12] Y. Gong, J. Tang, D. Zhao, Application of iron sulfide particles for groundwater and soil remediation: A review, Water Res. 89 (2016) 309-320. doi:10.1016/j.watres.2015.11.063.

[13] K. E. Waters, N. A. Rowson, R. W. Greenwood, A. J. Williams, The effect of heat treatment on the magnetic properties of pyrite, 21 (2008) 679-682. doi:10.1016/j.mineng.2008.01.008.

[14] H. Xiang, C. Liu, R. Pan, Y. Han, J. Cao, Magnetite for phosphorus removal in low concentration phosphorus-contained water body, Adv. Environ. Res. 3 (2014) 163-172.

[15] A. N. Thorpe, F. E. Senftle, C. C. Alexander, F. T. Dulong, Oxidation of pyrite in coal to magnetite, Fuel. 63 (1984) 662-668. doi:10.1016/0016-2361(84)90163-7.

[16] L. Wang, Y. X. Pan, J. H. Li, H. F. Qin, Magnetic properties related to thermal treatment of pyrite, Sci. China, Ser. D Earth Sci. 51 (2008) 1144-1153. doi:10.1007/s11430-008-0083-7.

[17] D. R. Lovley, E. J. P. Phillips, Requirement for a microbial consortium to completely oxidize glucose in Fe(III)-reducing sediments, Appl. Environ. Microbiol. 55 (1989) 3234-3236.

[18] I. Metcalf & Eddy, G. Tchobanoglous, H. D. Stensel, R. Tsuchihashi, F. Burton, Wastewater Engineering: Treatment and Resource Recovery, McGraw-Hill, New York, 2014.

[19] D. R. Lovley, Organic matter mineralization with the reduction of ferric iron: A review, Geomicrobiol. J. 5 (1987) 375-399. doi:10.1080/01490458709385975.

[20] H. M. Azam, K. T. Finneran, Ferric iron amendment increases Fe(III)-reducing microbial diversity and carbon oxidation in on-site wastewater systems, Chemosphere. 90 (2013) 1435-1443. doi:10.1016/j.chemosphere.2012.09.002.

[21] K. A. Weber, L. A. Achenbach, J. D. Coates, Microorganisms pumping iron: Anaerobic microbial iron oxidation and reduction, Nat. Rev. Microbiol. 4 (2006) 752-764. doi:10.1038/nrmicro1490.

[22] J. Esther, L. B. Sukla, N. Pradhan, S. Panda, Fe (III) reduction strategies of dissimilatory iron reducing bacteria, Korean J. Chem. Eng. 32 (2015) 1-14. doi:10.1007/s11814-014-0286-x.

[23] D. R. Lovley, Dissimilatory metal reduction, Annu. Rev. Microbiol. 47 (1993) 20-29. http://www.rte.ie/radio/mooneygoeswild/pdf/Secrets_of_Burmite_MAPS_Complete_with_color.pdf.

[24] D. Deng, L. S. Lin, Continuous sulfidogenic wastewater treatment with iron sulfide sludge oxidation and recycle, Water Res. 114 (2017) 210-217. doi:10.1016/j.watres.2017.02.048.

[25] APHA, AWWA, WEF, Standard methods for the examination of water and wastewater, 21st ed., American Public Health Association, American water Works Association, and Water Environment Federation, 2005.

[26] F. Cadena, R. W. Peters, Evaluation of Chemical Oxidizers for Hydrogen Sulfide Control, Water Pollut. Control Fed. 60 (1988) 1259-1263. doi:10.2307/25043633.

[27] G. K. Khadse, P. M. Patni, P. K. Labhasetwar, Removal of Iron and Manganese from drinking water supply, Sustain. Water Resour. Manag. 1 (2015) 157-165. doi:10.1021/ie50297a006.

[28] D. R. Lovley, D. J. Lonergan, Anaerobic oxidation of toluene, phenol, and p-cresol by the dissimilatory iron-reducing organism, GS-15, Appl. Environ. Microbiol. 56 (1990) 1858-1864. doi:10.1128/aem.72.5.3236-3244.2006.

[29] D. R. Lovley, E. J. P. Phillips, Novel Mode of Microbial Energy Metabolism: Organic Carbon Oxidation Coupled to Dissimilatory Reduction of Iron or Manganese, Appl. Environ. Microbiol. 54 (1988) 1472-1480. doi:10.1103/PhysRevLett.50.1998.

[30] D. Deng, J. L. Weidhaas, L.-S. Lin, Kinetics and microbial ecology of batch sulfidogenic bioreactors for co-treatment of municipal wastewater and acid mine drainage, J. Hazard. Mater. 305 (2016) 200-8. doi:10.1016/j.jhazmat.2015.11.041.

[31] S. Bratkova, S. Lavrova, A. Angelov, K. Nikolova, R. Ivanov, B. Koumanova, Treatment of wastewaters containing Fe, Cu, Zn and as by microbial hydrogen sulfide and subsequent removal of COD, N and P, J. Chem. Technol. Metall. 53 (2018) 245-257.

[32] S. Vaclavkova, C. J. JØrgensen, O. S. Jacobsen, J. Aamand, B. Elberling, The Importance of Microbial Iron Sulfide Oxidation for Nitrate Depletion in Anoxic Danish Sediments, Aquat. Geochemistry. 20 (2014) 419-435. doi:10.1007/s10498-014-9227-x.

[33] D. Csákberényi-Malasics, J. D. Rodriguez-Blanco, V. K. Kis, A. Rečnik, L. G. Benning, M. Pósfai, Structural properties and transformations of precipitated FeS, Chem. Geol. 294-295 (2012) 249-258. doi:10.1016/j.chemgeo.2011.12.009.

[34] F. Caccavo Jr, D. J. Lonergan, D. R. Lovley, M. Davis, J. F. Stolz, M. J. McInerney, *Geobacter sulfurreducens* sp. *nov.*, a Hydrogen- and Acetate-Oxidizing Dissimilatory Metal-Reducing Microorganism, Appl. Environ. Microbiol. 60 (1994) 3752-3759. doi:10.1111/j.1758-2229.2009.00055.x.

[35] K. P. Nevin, D. E. Holmes, T. L. Woodard, E. S. Hinlein, D. W. Ostendorf, D. R. Lovley, *Geobacter bemidjiensis* sp. *nov.* and *Geobacter psychrophilus* sp. *nov.*, two novel Fe(III)-reducing subsurface isolates, Int. J. Syst. Evol. Microbiol. 55 (2005) 1667-1674. doi:10.1099/ijs.0.63417-0.

[36] G. Zellner, P. Messner, H. Kneifel, J. Winter, *Desulfovibrio simplex* spec. *nov.*, a new sulfate-reducing bacterium from a sour whey digester, Arch. Microbiol. 152 (1989) 329-334. doi:10.1007/BF00425169.

[37] D. S. Han, B. Batchelor, A. Abdel-Wahaba, XPS Analysis of Sorption of Selenium(IV) and Selenium(VI) to Mackinawite (FeS), Environ. Prog. Sustain. Energy. 32 (2013) 84-93. doi:10.1002/ep.

[38] M. Descostes, F. Mercier, N. Thromat, C. Beaucaire, M. Gautier-Soyer, Use of XPS in the determination of chemical environment and oxidation state of iron and sulfur samples: Constitution of a data basis in binding energies for Fe and S reference compounds and applications to the evidence of surface species of an oxidized py, Appl. Surf. Sci. 165 (2000) 288-302. doi:10.1016/50169-4332(00)00443-8.

[39] A. R. Lennie, D. J. Vaughan, Spectroscopic studies of iron sulfide formation and phase relations at low temperatures, in: M. D. Dyar, C. McCammon, M. W. Schaefer (Eds.), Miner. Spectrosc. a Tribut. to Roger G. Burn,

[40] A. V. Naumkin, A. Kraut-Vass, S. W. Gaarenstroom, C. J. Powell, NIST X-ray Photoelectron Spectroscopy Database, (2012). doi:http://dx.doi.org/10.18434/T4T88K.

[41] J. P. Gramp, J. M. Bigham, F. S. Jones, O. H. Tuovinen, Formation of Fe-sulfides in cultures of sulfate-reducing bacteria, J. Hazard. Mater. 175 (2010) 1062-1067. doi:10.1016/j.jhazmat.2009.10.119.

[42] D. A. Bazylinski, R. B. Frankel, K. O. Konhauser, Modes of biomineralization of magnetite by microbes, Geomicrobiol. J. 24 (2007) 465-475. doi:10.1080/01490450701572259.

[43] B. M. Moskowitz, R. B. Frankel, D. A. Bazylinski, H. W. Jannasch, D. R. Lovley, A comparison of magnetite particles produced anaerobically by magnetotactic and dissimilatory iron-reducing bacteria, Geophys. Research Lett. 16 (1989) 665-668.

[44] S. E. Childers, S. Ciufo, D. R. Lovley, *Geobacter metallireducens* accesses insoluble Fe(III) oxide by chemotaxis, Nature. 416 (2002) 767-769. doi:10.1038/416767a.

[45] J. D. Coates, V. K. Bhupathiraju, L. A. Achenbach, M. J. Mcinerney, D. R. Lovley, *Geobacter hydrogenophilus*, *Geobacter chapellei* and *Geobacter grbiciae*, three new, strictly anaerobic, dissimilatory Fe(III)-reducers, Int. J. Syst. Evol. Microbiol. 51 (2001) 581-588.

[46] K. P. Nevin, D. R. Lovley, Mechanisms for accessing insoluble Fe(III) oxide during dissimilatory Fe(III) reduction by *Geothrix fermentans*, Appl. Environ. Microbiol. 68 (2002) 2294-2299. doi:10.1128/AEM.68.5.2294-2299.2002.

[47] N. W. Fortney, S. He, A. Kulkarni, M. W. Friedrich, C. Holz, E. S. Boyd, E. E. Roden, Stable isotope probing for microbial iron reduction in Chocolate Pots hot spring, Yellowstone National Park, Appl. Environ. Microbiol. 84 (2018). doi:10.1128/AEM.02894-17.

[48] O. A. Podosokorskaya, V. V. Kadnikov, S. N. Gavrilov, A. V. Mardanov, A. Y. Merkel, O. V. Karnachuk, N. V. Ravin, E. A. Bonch-Osmolovskaya, I. V. Kublanov, Characterization of Melioribacter roseus gen. nov., sp. nov., a novel facultatively anaerobic thermophilic cellulolytic bacterium from the class *Ignavibacteria*, and a proposal of a novel bacterial phylum Ignavibacteriae, Environ. Microbiol. 15 (2013) 1759-1771. doi:10.1111/1462-2920.12067.

[49] D. R. Lovley, S. J. Giovannoni, D. C. White, J. E. Champine, E. J. P. Phillips, Y. A. Gorby, S. Goodwin, *Geobacter metallireducens* gen. nov. sp. nov., a microorganism, Arch. Microbiol. 159 (1993) 336-344.

[50] R. Rabus, S. S. Venceslau, L. Wöhlbrand, G. Voordouw, J. D. Wall, I. A. C. Pereira, A Post-Genomic View of the Ecophysiology, Catabolism and Biotechnological Relevance of Sulphate-Reducing Prokaryotes, Adv. Microb. Physiol. 66 (2015) 55-321. doi:10.1016/bs.ampbs.2015.05.002.

[51] A. El Houari, M. Ranchou-Peyruse, A. Ranchou-Peyruse, A. Dakdaki, M. Guignard, L. Idouhammou, R. Bennisse, R. Bouterfass, R. Guyoneaud, A. I. Qatibi, *Desulfobulbus oligotrophicus* sp. nov., a sulfate-reducing and propionate-oxidizing bacterium isolated from a municipal anaerobic sewage sludge digester, Int. J. Syst. Evol. Microbiol. 67 (2017) 275-281. doi:10.1099/ijsem.0.001615.

[52] S. J. W. H. O. Elferink, R. N. Maas, H. J. M. Harmsen, A. J. M. Stams, *Desulforhabdus amnigenus* gen. nov. sp. nov., a sulfate reducer isolated from anaerobic granular sludge, Arch. Microbiol. 164 (1995) 119-124.

[53] M. Balk, M. Altinba, W. I. C. Rijpstra, J. S. S. Damsté, A. J. M. Stams, *Desulfatirhabdium butyrativorans* gen. nov., sp. nov., a butyrate-oxidizing, sulfate-reducing bacterium isolated from an anaerobic bioreactor, Int. J. Syst. Evol. Microbiol. 58 (2008) 110-115. doi:10.1099/ijs.0.65396-0.

[54] K. A. DeWeerd, L. Mandelco, R. S. Tanner, C. R. Woese, J. M. Suflita, *Desulfomonile* tiedjei gen. nov. and sp. nov., a novel anaerobic, dehalogenating, sulfate-reducing bacterium, Arch. Microbiol. 154 (1990) 23-30. doi:10.1103/PhysRev.85.816.

[55] M. L. Coleman, D. B. Hedrick, D. R. Lovley, D. C. White, K. Pye, Reduction of Fe(III) in sediments by sulphate-reducing bacteria, Nature. 361 (1993) 436-438. doi:10.1038/361436a0.

[56] B. M. Tebo, A. Y. Obraztsova, Sulfate-reducing bacterium grows with Cr (VI), U (VI), Mn (IV), and Fe (III) as electron acceptors, Source. 162 (1998) 193-198. doi:10.1111/j.1574-6968.1998.tb12998.x.

[57] D. E. Holmes, D. R. Bond, D. R. Lovley, Electron Transfer by *Desulfobulbus propionicus* to Fe (III) and Graphite Electrodes Electron Transfer by *Desulfobulbus propionicus* to Fe (III) and Graphite Electrodes, Appl. Environ. Microbiol. 70 (2004) 1234-1237. doi:10.1128/AEM.70.2.1234.

[58] A. Ueki, H. Akasaka, D. Suzuki, K. Ueki, *Paludibacter propionicigenes* gen. nov., sp. nov., a novel strictly anaerobic, Gram-negative, propionate-producing bacterium isolated from plant residue in irrigated rice-field soil in Japan, Int. J. Syst. Evol. Microbiol. 56 (2006) 39-44. doi:10.1099/ijs.0.63896-0.

[59] S. Dröge, R. Rachel, R. Radek, H. König, *Treponema isoptericolens* sp. nov., a novel spirochaete from the hindgut of the termite *Incisitermes tabogae*, Int. J. Syst. Evol. Microbiol. 58 (2008) 1079-1083. doi:10.1099/ijs.0.64699-0.

[60] W. M. Chen, Z. J. Tseng, K. S. Lee, J. S. Chang, Fermentative hydrogen production with *Clostridium butyricum* CGS5 isolated from anaerobic sewage sludge, Int. J. Hydrogen Energy. 30 (2005) 1063-1070. doi:10.1016/j.ijhydene.2004.09.008.

[61] M. Shah, C.-C. Lin, R. Kukkadapu, M. H. Engelhard, X. Zhao, Y. Wang, T. Barkay, N. Yee, Syntrophic Effects in a Subsurface Clostridial Consortium on Fe(III)-(Oxyhydr)oxide Reduction and Secondary Mineralization, Geomicrobiol. J. 31 (2014) 101-115.

[62] P. S. Dobbin, J. P. Carter, C. G. S. S. Juan, M. Von Hobe, A. K. Powell, D. J. Richardson, Dissimilatory Fe(III) reduction by *Clostridium beijerinckii* isolated from freshwater sediment using Fe(III) maltol enrichment, FEMS Microbiol. Lett. 176 (1999) 131-138. doi:10.1016/S0378-1097(99)00229-3.

[63] T. Yamada, Y. Sekiguchi, H. Imachi, Y. Kamagata, A. Ohashi, H. Harada, Diversity, Localization, and Physiological Properties of Filamentous Microbes Belonging to, Microbiology. 71 (2005) 7493-7503. doi:10.1128/AEM.71.11.7493.

[64] S. A. Ifo, J. M. Moutsambote, F. Koubouana, J. Yoka, S. F. Ndzai, L. N. O. Bouetou-Kadilamio, H. Mampouya, C. Jourdain, Y. Bocko, A. B. Mantota, M. Mbemba, D. Mouanga-Sokath, R. Odende, L. R. Mondzali, Y. E. M. Wenina, B. C. Ouissika, L. J. Joel, Tree Species Diversity, Richness, and Similarity in Intact and Degraded Forest in the Tropical Rainforest of the Congo Basin: Case of the Forest of Likouala in the Republic of Congo, Int. J. For. Res. 2016 (2016). doi:10.1155/2016/7593681.

[65] M. Grabchak, E. Marcon, G. Lang, Z. Zhang, The generalized Simpson's entropy is a measure of biodiversity, PLoS One. 12 (2017) 1-11. doi:10.1371/journal.pone.0173305.

[66] S. R. Hiibel, L. P. Pereyra, M. V. R. Breazeal, D. J. Reisman, K. F. Reardon, A. Pruden, Effect of Organic Substrate on the Microbial Community Structure in Pilot-Scale Sulfate-Reducing Biochemical Reactors Treating Mine Drainage, Environ. Eng. Sci. 28 (2011) 563-572. doi:10.1089/ees.2010.0237.

[67] M. Koschorreck, W. Geller, T. Neu, S. Kleinsteuber, T. Kunze, A. Trosiener, K. Wendt-Potthoff, Structure and function of the microbial community in an in situ reactor to treat an acidic mine pit lake, FEMS Microbiol. Ecol. 73 (2010) 385-395. doi:10.1111/j.1574-6941.2010.00886.x.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

It is further to be understood that all values are approximate, and are provided for description.

All patents, applications, publications, test methods, literature, and other materials cited herein are incorporated by reference. If there is a discrepancy between (a) the incorporated by reference patents, applications, publications, test methods, literature, and other materials, and (b) the present application, then the present application's specification, figures, and claims control the meaning of any terms and the scope of the inventions set forth herein.

What is claimed is:

1. A wastewater treatment system comprising a wastewater reservoir, a ferric iron solution reservoir, an anaerobic bioreactor, and an effluent reservoir, wherein said wastewater reservoir is connected to said anaerobic bioreactor via a first port, wherein said ferric iron solution reservoir is connected to said anaerobic bioreactor via a second port, and wherein said effluent reservoir is connected to said anaerobic bioreactor via a third port, and wherein said anaerobic bioreactor contains one or more of an iron reducing bacteria and one or more of a sulfate reducing bacteria, and a fourth port for providing internal recirculation within said anaerobic bioreactor, a first pump in communication with the first port for feeding a wastewater from the wastewater reservoir to said anaerobic bioreactor, a second pump in communication with said second port for feeding a ferric iron solution from said ferric iron solution reservoir to said anaerobic bioreactor, and a third pump in communication with said fourth port for providing said internal recirculation of the wastewater within the anaerobic bioreactor.

2. The wastewater treatment system of claim 1 wherein said anaerobic bioreactor contains one or more of a iron reducing bacteria, one or more of a sulfate reducing bacteria, and one or more of a fermentative bacteria.

3. The wastewater treatment system of claim 2 wherein said ferric iron solution is selected from the group consisting of ferric chloride, acid mine drainage, and an electron acceptor for organic oxidation that is not oxygen.

4. A method for treating wastewater comprising
adding a sulfate containing wastewater and an effective amount of a ferric iron containing solution to an anaerobic bioreactor wherein said anerobic bioreactor is a vessel that has a top, a bottom, and one or more side walls, and one or more ports for entry of one or more influents and exit of one or more effluents, and providing said anerobic bioreactor with one or more of an iron reducing bacteria and one or more of a sulfate reducing bacteria, and one or more of a fermentative bacteria, to form a mixture in said anaerobic bioreactor of said sulfate containing wastewater, said ferric iron containing solution, said iron reducing bacteria, said sulfate reducing bacteria, and said fermentative bacteria;
maintaining an anaerobic condition in said anaerobic bioreactor; adjusting a dosage of said ferric iron containing solution to said mixture in said anaerobic bioreactor to achieve a Fe/Sulfate molar ratio that is equal to or greater than 0.50; providing an internal recirculation of said mixture in said anaerobic bioreactor; maintaining a neutral pH of said mixture in said anaerobic bioreactor; producing a sludge at said bottom of said anaerobic bioreactor; and removing an effluent from said anaerobic bioreactor that is a treated wastewater.

5. The method of claim 4 including removing said sludge from said anaerobic bioreactor.

6. The method of claim 4 including wherein said sulfate containing wastewater is derived from domestic, municipal, and industrial sources.

7. The method of claim 6 wherein said sulfate containing wastewater includes suspended solids, biodegradable organics, pathogens, nutrients, heavy metals, and pollutants.

8. The method of claim 4 including increasing said ferric iron dosage of said mixture in said anaerobic bioreactor to affect an enhanced organic component removal and oxidation kinetics.

9. The method of claim 4 including increasing said ferric iron dosage to affect a lowering of a sulfide level in said effluent through forming iron sulfide precipitates.

10. The method of claim 4 including increasing a chemical oxygen demand removal.

11. The method of claim 4 including wherein said iron reducing bacteria is selected from the group consisting of *Geobacter* sp., *Ignavibacteria* sp., and *Geothrix* sp.

12. The method of claim 4 including wherein said sulfate reducing bacteria is selected from the group of *Desulfovibrio* sp., *Desulfobulbus* sp., *Desulfatirhabdium* sp, *Desulforhabdus* sp., and *Desulfomonile* sp.

13. The method of claim 4 including wherein said ferric iron containing solution is selected from the group consisting of ferric chloride, acid mine drainage, and an electron acceptor for organic oxidation that is not oxygen.

* * * * *